April 7, 1942.  M. B. SAWYER  2,279,014
ELECTROMAGNETIC APPARATUS
Filed Sept. 22, 1938
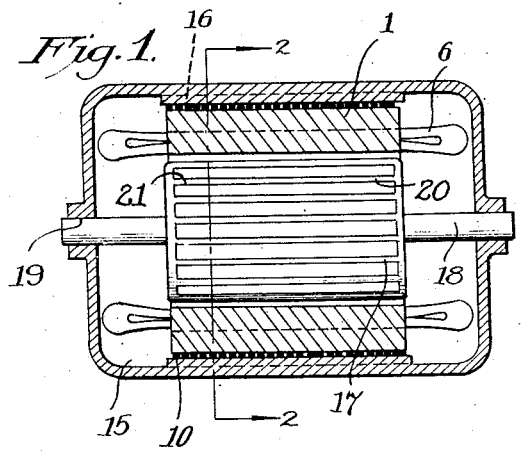
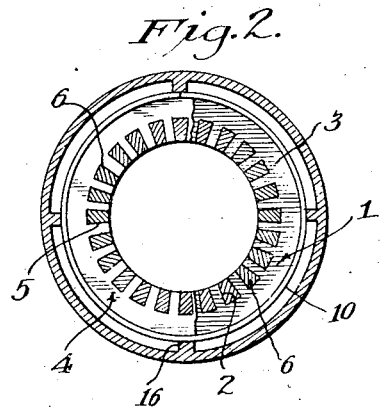
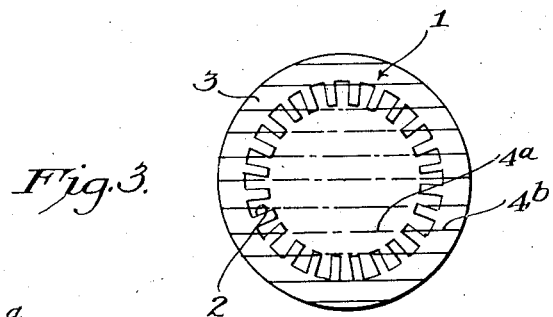
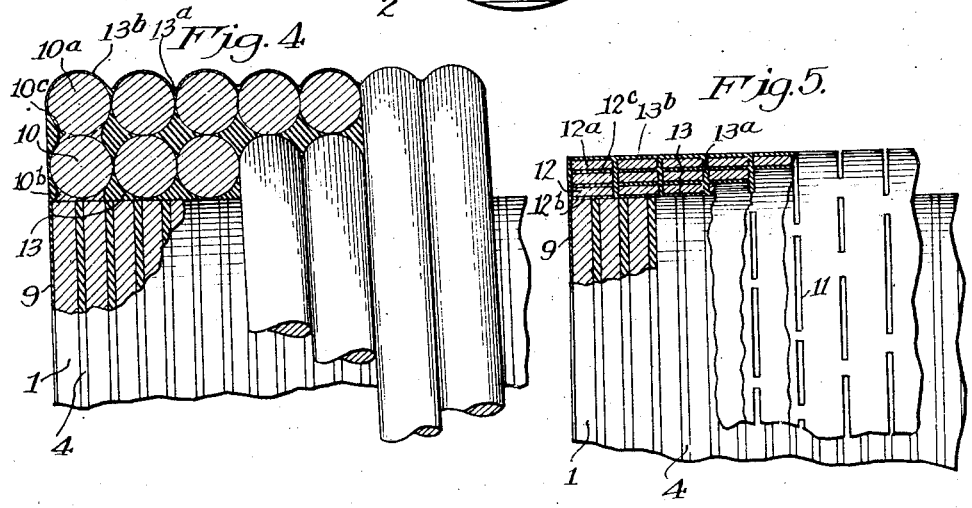
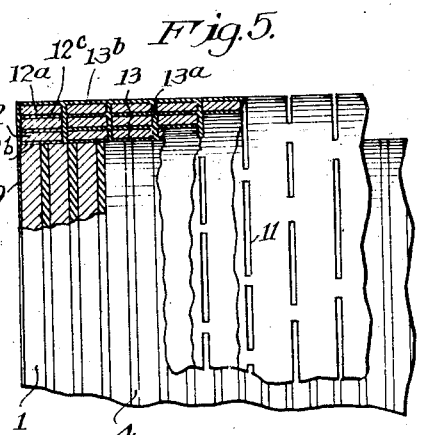
INVENTOR.
Marion B. Sawyer,
BY R. W. Smith
ATTORNEY.

Patented Apr. 7, 1942

2,279,014

UNITED STATES PATENT OFFICE 2,279,014

ELECTROMAGNETIC APPARATUS

Marion B. Sawyer, Los Angeles, Calif., assignor to Sawyer Electrical Manufacturing Company, Los Angeles, Calif., a corporation of California Application September 22, 1938, Serial No. 231,221

13 Claims. (Cl. 171—252)

This invention relates to electro-magnetic apparatus, the present application being a continuation in part of my copending application Ser. No. 751,551, filed November 5, 1934.

It is the object of the invention to adapt an electro-magnet for operation at high flux density without undue eddy currents or leakage of magnetic flux, thereby providing maximum output for minimum size and weight, without excessive heating.

More particularly it is an object of the invention to provide a laminated core for an electro-magnet having insulation of predetermined uniform thickness between its laminations and forming the sole means for securing the laminations in assembled relation, thereby minimizing and localizing eddy currents in the laminated core.

It is a still further object of the invention to minimize and localize eddy currents in the magnetically permeable shield.

It is a still further object of the invention to provide a path of low magnetic reluctance around the core, between the latter and a supporting structure which surrounds the core and which is of non-magnetic material, whereby stray magnetic flux is prevented from passing through and inducing eddy currents in the supporting structure.

Further objects of the invention will be readily understood from the following description of an embodiment illustrated in the accompanying drawing, in which:

Fig. 1 is an axial section through an induction motor.

Fig. 2 is a transverse section on the line 2—2 of Fig. 1, with the rotor of the induction motor removed.

Fig. 3 is a transverse section through the stator of an induction motor, before winding the same and showing a modification.

Fig. 4 is a fragmentary side elevation of the stator of an induction motor, partly in axial section.

Fig. 5 is a similar view, showing a modification.

The invention is generally applicable to cores for electro-magnets; but is particularly applicable and therefore will be described in connection with the stator of an induction motor. Such a stator comprises annular laminations 1, preferably of steel or iron, with each lamination an integral structure having slots 2 at its inner periphery and an annular yoke 3 at its outer periphery in back of its slots. The annular laminations are stacked with their slots 2 in alinement so as to form longitudinal channels for reception of the stator windings.

The laminations are retained in assembled relation by a medium which also provides insulation between the laminations; and a uniform thickness of this medium is provided between next adjacent laminations so that the assembled stator will have a predetermined metal content and a predetermined content of the binder-insulator. For this purpose, absorbent material is placed between the laminations 1 and is impregnated with a liquid which later becomes substantially infusible and forms a binder-insulator for the stator.

Referring to Fig. 2, the absorbent material comprises sheets 4 of very thin tissue paper of the same shape as the annular laminations 1, including slotted inner peripheries 5. The absorbent sheets are of predetermined uniform thickness, a uniform thickness of these sheets, preferably a single sheet, is placed between next adjacent laminations.

A modification is shown at Fig. 3, wherein the absorbent material comprises fibrous threads of uniform diameter juxtapositioned between laminations 1, so as to provide a predetermined uniform thickness of the absorbent material between next adjacent laminations. After the laminations have been stacked with the threads therebetween, those portions of the threads which obstruct the bore and the slots of the stator may be burnt out as shown at 4ª, leaving unburnt portions of the threads between next adjacent laminations as shown at 4ᵇ.

When the metal laminations and the absorbent material have been alternately stacked to form a stator of desired length, the windings 6 for the stator are placed in the channels formed by the slots 2; the stator being preferably suitably clamped in assembled relation while thus winding the same.

The absorbent material between the metal laminations is then impregnated with a liquid which also coats the stator and its windings; and this liquid is then made substantially infusible and forms a binder-insulator for the stator. The liquid is a high dielectric having great adhesive qualities, and is preferably a thermosetting liquid which becomes substantially infusible to form electrical insulation and an efficient binder, with no tendency to melt or break down when subjected to the temperature and magnetic flux incident to operation of electro-magnetic apparatus such as an induction motor.

The thermosetting liquid may be a solution comprising 50% by weight of resin and 50% by weight of solvent; such as any one of the products, readily soluble and having a melting point appreciably higher than the temperature required to form a substantially infusible film, described and claimed in U. S. Patents No. 1,800,-295 of April 14, 1931; No. 1,800,296 of April 14, 1931; No. 1,870 453 of August 9, 1932; No. 1,870,-454 of August 9, 1932; and No. 1,870,455 of August 9, 1932. Such a thermosetting liquid consists of a polybasic acid and polyhydric alcohol combined with fatty acids. Chlorinated diphenyl resins also form suitable thermosetting liquids.

The wound stator is immersed in the thermosetting liquid which thus impregates the absorbent material between the metal laminations and also coats the stator and its windings. To insure adequate impregnation, the stator may be heated, preferably in the neighborhood of 120° C., and may then be submerged in the liquid which is at atmospheric temperature. The liquid may be in a closed container and may be under pressure, e. g. in the neighborhood of 2,000 lbs. per sq. in., or may be under vacuum, or may be alternately subjected to pressure and vacuum.

The cooling effect of the liquid tends to contract the air between the metal laminations so that the liquid is drawn into these spaces for impregnating the absorbent material, with capillary attraction and pressure or vacuum, or alternation of pressure and vacuum, aiding in such impregnation.

When the absorbent material of the stator has been impregnated and the stator itself has been coated, the stator is removed from the liquid and is then heated until the impregnating and coating liquid becomes substantially infusible. When employing a liquid such as has been described, the stator is preferably heated for approximately 8 hours at a temperature of approximately 120° C.

The resulting substantially infusible film of the thermoset liquid provides electrical insulation of uniform thickness between next adjacent metal laminations, and also provides a film of electrical insulation 9 coating the stator and its windings. The electrical insulation between the metal laminations minimizes short-circuited conducting paths of eddy currents and other losses incident to operation of an electro-magnet at high flux density. The films of infusible material between next adjacent metal laminations also securely bind the laminations to one another, so as to form substantially as sturdy and rigid a construction as if the metal laminations had been welded or riveted together, but without short-circuiting the metal laminations as in a riveted or welded construction.

By thus minimizing and localizing eddy currents, core losses resulting in temperature rise are decreased, thereby permitting high flux densities and increasing the efficiency of a core with relation to its magnetic section. The core may thus be advantageously employed in constructions such as stators for induction motors where it is desired to obtain high output in comparison with size and weight.

The invention also provides for magnetically isolating the core of an electro-magnet by a magnetically permeable shield with a gap in the flux path between the shield and the core; and since this feature of the invention is particularly applicable to the stator of an induction motor (such as previously described) it will be explained in that connection.

The shield minimizes leakage of stray magnetic flux from the annular yoke 3 which is an integral part of the stator. For this purpose, the shield is of magnetically permeable material such as iron and surrounds the outer periphery of the stator with a gap in the flux path between the shield and the annular yoke 3, and is continuous in the direction of the lines of magnetic force around the annular yoke. The separation of the low reluctance shield material from the stator core by a gap of high reluctance results in a greater flux density in the core and the flux density in the shield does not reach saturation point. This means that the shield has a tendency to gather unto itself all stray flux, and since it is not saturated with flux, there will be very little, if any, flux passing out through the shell where it might result in eddy current losses. The invention provides a stator having a core operating at a high flux density, approaching saturation point, and with very little, if any, eddy current losses.

The shield is preferably arranged so that while it is continuous around the yoke 3, it is interrupted in planes transverse to the axis of the stator so as to minimize eddy currents in the shield.

The shield also provides a path of low magnetic reluctance around the stator, between the latter and a supporting structure for the same which surrounds the stator and which is usually a non-magnetic conductor. The shield thus prevents stray magnetic flux passing through the supporting structure; and thus minimizes induced currents (with resulting losses) in the supporting structure.

Referring to Fig. 4, the shield is shown as annuli of magnetically permeable material surrounding the yoke 3, to a depth of one or more layers, with the annuli in close juxtaposition along the entire length of the stator. These annuli may each comprise a separate closed ring; but in practice a wire is preferably wound continuously around the annular yoke 3, so as to form a series of loops 10 in close juxtaposition along the length of the stator and snugly surrounding the yoke 3 (but not integral therewith), with the wire then wound so as to form a second series of loops 10ᵃ in close juxtaposition along the length of the stator and overlying the first series of loops. At the ends of the stator the wire is fixed thereto, e. g. the loops 10 at the respective ends of the stator may be welded to the stator, the welding of the loop 10 which is at one end of the stator being shown at 10ᵇ and the loop 10 at the opposite end of the stator and which is not shown at Fig 4 being similarly welded, and if the wound wire is a series of loops overlying one another as shown at 10—10ᵃ, the loops 10ᵃ at the respective ends of the stator may be welded to the underlying loops 10, the welding at the loop 10ᵃ which is at one end of the stator being shown at 10ᶜ and the loop 10ᵃ which is at the opposite end of the stator and which is not shown at Fig. 4 being similarly welded.

Referring to Fig. 5, the shield is an integral wrapping of magnetically permeable material extending the length of the stator and wrapped snugly around its annular yoke 3, preferably to a depth of several wrappings. The wrapping is slotted as shown at 11, so as to form a series of circumferentially spaced slots around the shield, with a plurality of these series of slots in spaced juxtaposition along the length of the stator. The shield, between next adjacent series of slots, thus forms a series of annuli 12 in close juxtaposition along the length of the stator and snugly surrounding the yoke 3 (but not integral therewith; and if the shield includes a second wrapping it forms a second series of annuli 12ª in close juxtaposition along the length of the stator and overlying the first series of annuli. At the ends of the stator the wrapped shield is fixed thereto, e. g. the wrapping 12 may be welded to each end of the stator at a plurality of circumferentially spaced points, the welding at one end of the stator being shown at 12ᵇ and the wrapping 12 being similarly welded to the opposite end of the stator which is not shown at Fig. 5, and if the wrapped shield is a series of overlying wrappings as shown at 12—12ª, each overlying wrapping is welded at each end of the stator to the next underlying wrapping, the welding of the wrappings 12ª being shown at 12ᶜ at one end of the stator, and these wrappings being similarly welded at the opposite end of the stator which is not shown at Fig. 5.

The shield is preferably electrically insulated from the stator, and its respective loops or annuli are preferably electrically insulated from one another to prevent eddy current losses in the shield. Possible line contact between the parts at relatively isolated points are not harmful in this respect. A coating of electrical insulation is preferably also provided at the exterior of the shield.

This electrical insulation is preferably films of the same high dielectric as previously described, which is normally liquid for coating the shield and filling the air gaps between its respective annuli and between the shield and the stator, and which becomes substantially infusible when heated. For this purpose, the stator with the shield in place, is again heated and immersed in the thermosetting liquid dielectric, in the same manner as previously described; and after removal from the liquid dielectric the stator is again heated as previously described so as to form an infusible film of insulation between the stator and the shield as shown at 13, and between the juxtapositioned annuli of the shield as shown at 13ª, and at the outer surface of the shield as shown at 13ᵇ.

The shielded stator is preferably mounted in a motor shell 15, which in accordance with usual practice may be of non-magnetic material and which may have usual circumferentially spaced longitudinal ribs 16 for supporting the stator. The stator is thus supported in the shell with its shield between the stator and the shell. To complete the induction motor, a rotor 17 is mounted in the stator with its shaft 18 journaled in end bearings 19 of the motor shell, and with windings 20 for the rotor mounted in slots 21 at the outer periphery of the rotor.

A shield constructed as herein described provides a continuous path of low magnetic reluctance in the direction of the lines of magnetic force around the core of the electro-magnet with which it is employed, with a gap in the flux path between the shield and the core. This gap in flux path between the core and its shield is due to the shield being non-integral with the core of the electro-magnet, it being understood that as regards gap in flux path, there is such a gap between magnetically permeable elements as long as they are not integral with one another and no matter how intimate their physical contact and irrespective of there being electrical insulation between said elements. Due to this air gap between the annular yoke 3 and the shield which is continuous around the same, the magnetic field in the shield will be less dense than that in the annular yoke 3 of the stator and there will be less tendency for stray flux to reach the outer shell and result in eddy current losses therein.

The shield, while continuous around the core of the electro-magnet with which it is employed, is interrupted in planes transverse to the axis of said core; this interruption being due to the air gap between the juxtapositioned annuli which form the shield, and which air gaps result from the juxtapositioned annuli being spaced by the slots 11 (Fig. 5) or being loops which cross-sectionally are non-integral with one another (Fig. 4). These air gaps, transverse to the axis of the stator which is surrounded by the shield, thus interrupt current paths in the shield lengthwise of the stator and thus minimize eddy currents in the shield.

As previously described, the shield forms a path of low magnetic reluctance in the direction of the lines of magnetic force around the core of the electro-magnet with which it is employed, with an air gap between the core and its shield; and when the shield comprises a plurality of superimposed layers such as shown at 10—10ª or at 12—12ª a similar air gap is formed between the superimposed layers. The shield is between the electro-magnet and the shell such as shown at 15 in which the electro-magnet is mounted; and there is an air gap between the shield and this supporting shell, due to the shield being non-integral with the shell. The shield thus provides a path of low magnetic reluctance around the annular yoke 3, between the latter and the shell 15 which surrounds said annular yoke and which is usually of non-magnetic material, with air gaps interrupting current paths between the stator of the induction motor and its shield and between the shield and the outer shell 15. Stray magnetic flux which enters the shield, thus follows a path around the shield so that it is prevented from passing through the non-magnetic shell 15, as would induce eddy currents in the shell and thus develop heat with consequent loss of energy and undesirable temperature rise. Furthermore, the magnetic flux upon entering the shield from the annular yoke 3 and then returning from the shield to the annular yoke, crosses a double air gap in passing from one magnetic pole to the next, thereby following a path of substantially higher over all reluctance than that in the stator yoke 3.

The effectiveness of the air gaps between the stator and its shield, between superimposed layers of the shield, between juxtapositioned annuli of the shield, and between the shield and the shell 15, may be increased by usual scale on uncleaned iron of which the shield may be formed, and is further increased by the insulation 13, 13ª and 13ᵇ. The effectiveness of the air gaps may be further increased by forming the shield of wire 10—10ª which is circular in cross-section as shown at Fig 4, so as to provide only line contact between the wire and the stator and between juxtapositioned loops of wire and between the superimposed layers of wire and between the wire and the shell 15.

To further reduce eddy currents in the shield itself, its respective loops or annuli may be of restricted cross-sectional area. For example, as shown at Fig. 4, the shield 10—10ᵃ may be wire having a diameter of only approximately 1/32 to 1/16 inch, thereby making negligible eddy currents in the wire itself.

The effectiveness of the shield may be increased by providing any desired plurality of superimposed layers 10—10ᵃ or 12—12ᵃ, thereby providing additional air gaps between the additional superimposed layers of the shield, and also taking advantage of the additional magnetically permeable material provided by these additional layers of the shielding medium. Each successive layer of the shield will have a lower flux density and will more effectively prevent stray flux losses. However, there is a limit for any given motor as to the practicalness of adding layers which increase the weight and size of the shield.

The invention as thus described provides efficient operation of electro-magnetic apparatus such as an induction motor, without excessive heating, and with the primary so dimensioned for decreasing motor weight that the magnetic flux density in the yoke 3 in back of the stator slots 2 may be very high. This is made possible by insulating the laminations of the stator one from another as herein described, so that eddy currents in the stator are minimized and localized, and by providing a shield between the stator and its supporting shell as herein described, for minimizing flux leakage from the stator and localizing eddy currents in the shield, and preventing stray flux passing through the supporting shell 15. Furthermore the shield adds materially to the area of the magnetic circuit in back of the stator slots, and by thius increasing the magnetic section at the point of highest flux density, decreases the stray flux tending to induce eddy currents, and thus reduces losses from such eddy currents and provides a high output in comparison with the diameter of the motor.

I claim:

1. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, a shell surrounding and extending longitudinally of the outer member, with a space extending around and longitudinally of the outer member between it and the shell, and a magnetically permeable shielding element in said space and extending around and longitudinally of said space, there being a gap of high reluctance in the flux path between the outer member and the shield element, and the shielding element being interrupted in planes transverse to the axis of the stator-rotor.

2. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, a shell surrounding and extending longitudinally of the outer member, with a space extending around and longitudinally of the outer member between it and the shell, and a magnetically permeable shielding element in said space and extending around the longitudinally of said space, there being a gap of high reluctance in the flux path between the outer member and the shield element, and the shielding element comprising a plurality of parts having films of electrical insulation therebetween in planes transverse to the axis of the stator-rotor.

3. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, a shell surrounding and extending longitudinally of the outer member, with a space extending around and longitudinally of the outer member between it and the shell, and a magnetically permeable shielding element in said space and extending around and longitudinally of said space, there being a gap of high reluctance in the flux path between the outer member and the shielding element, and the shielding element comprising a plurality of parts sparate from one another in planes transverse to the axis of the stator-rotor, with said parts of cross-sectional contour making only line contact with and around the outer member.

4. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having slots and teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, a shell surrounding and extending longitudinally of the outer member, with a space extending around and longitudinally of the outer member between it and the shell, and a magnetically permeable shielding element in said space and extending around and longitudinally of said space, there being a gap of high reluctance in the flux path between the outer member and the shielding element, and the shielding element comprising a plurality of parts separate from one another in planes transverse to the axis of the stator-rotor, with said parts of limited dimension in the direction of eddy currents to prevent said currents from building up in said shield.

5. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having a plurality of slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, a shell surrounding and extending longitudinally of the outer member, with a space extending around and longitudinally of the outer member between it and the shell, and a magnetically permeable shielding element in said space and extending around and longitudinally of said space, there being a gap of high reluctance in the flux path between the outer member and the shielding element, and the shielding element comprising a plurality of parts separate from one another in planes transverse to the axis of the stator-rotor, with said parts circular in cross-section.

6. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having a plurality of slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, a shell surrounding and extending longitudinally of the outer member, with a space extending around and longitudinally of the outer member between it and the shell, and a magnetically permeable wire in said space and wound continuously around and along the outer member with the planes of separation between the loops of the wire transverse to the axis of the stator-rotor.

7. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having a plurality of parallel slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, and a magnetically permeable shielding element extending around and longitudinally of the outer member, there being a gap of high reluctance in the flux path between the outer member and the shielding element, and the shielding element being interrupted in planes transverse to the axis of the stator-rotor.

8. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having a plurality of parallel slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, and a magnetically permeable wire wound continuously around and along the outer member with the planes of separation between the loops of the wire transverse to the axis of the stator-rotor.

9. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having a plurality of parallel slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, and a magnetically permeable shielding element extending around and longitudinally of the outer member, there being a gap of high reluctance in the flux path between the outer member and the shielding element, and the shielding element comprising a plurality of parts having films of electrical insulation therebtween in planes transverse to the axis of the stator-rotor.

10. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having a plurality of parallel slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, and a magnetically permeable shielding element extending around and longitudinally of the outer member, there being a gap of high reluctance in the flux path between the outer member and the shielding element, and the shielding element comprising a plurality of parts separate from one another in planes transverse to the axis of the stator-rotor, with said parts of cross-sectional contour making only line contact with and around the outer member.

11. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having a plurality of parallel slots separated by teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, and magnetically permeable annuli surrounding the outer member in juxtaposition longitudinally thereof, there being a gap of high reluctance in the flux path between the outer member and the annuli.

12. In electro-magnetic apparatus, an inner cylindrical member, an outer member having a cylindrical bore for coaxial reception of the inner cylindrical member, the outer member extending longitudinally of the inner cylindrical member, one of said members being a stator and the other of said members being a rotor, the outer member having alternate slots and teeth at its cylindrical bore and having a continuous annular yoke integral with said teeth outwardly therebeyond radially of the axis of the stator-rotor, the cylindrical member having alternate slots and teeth at its outer periphery, windings in the slots of the stator-rotor, and a magnetically permeable shielding element extending around and longitudinally of the outer member, there being a gap of high reluctance in the flux path between the outer member and the shielding element, and the shielding element having a series of circumferentially spaced slots extending arcuately around the shielding element, with the series of slots in planes transverse to the axis and in spaced relation longitudinally of the stator-rotor.

13. In an electro-magnetic apparatus, an alternating current magnet having a flux circuit divided into a work portion and a return portion, the latter portion passing through a laminated magnetic core operating at high flux density under normal working conditions, and a magnetic shield of relatively low reluctance and low flux density disposed on the back of said core to provide a path for stray flux, said shield being disposed relative to said core to provide a high reluctance path for the flux passing therebetween to maintain a high density of flux in said core.

MARION B. SAWYER.